United States Patent
Zhang et al.

(10) Patent No.: US 12,464,425 B2
(45) Date of Patent: Nov. 4, 2025

(54) SYSTEMS AND METHODS FOR STANDALONE CARRIER AGGREGATION HANDOVER

(71) Applicant: Apple Inc., Cupertino, CA (US)

(72) Inventors: Kai Zhang, Beijing (CN); Ajay Singh, San Jose, CA (US); Deepankar Bhattacharjee, San Jose, CA (US); Lele Cui, Beijing (CN); Lijie Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 561 days.

(21) Appl. No.: 17/947,003

(22) Filed: Sep. 16, 2022

(65) Prior Publication Data

US 2023/0088031 A1  Mar. 23, 2023

Related U.S. Application Data

(60) Provisional application No. 63/246,642, filed on Sep. 21, 2021.

(51) Int. Cl.
*H04W 36/00* (2009.01)
*H04W 36/08* (2009.01)

(52) U.S. Cl.
CPC . *H04W 36/0088* (2013.01); *H04W 36/00692* (2023.05); *H04W 36/08* (2013.01)

(58) Field of Classification Search
CPC ....... H04W 36/0088; H04W 36/00692; H04W 36/08; H04W 36/0058
See application file for complete search history.

(56) References Cited

U.S. PATENT DOCUMENTS

| | | | |
|---|---|---|---|
| 10,708,740 B2 * | 7/2020 | Jang | H04W 4/70 |
| 2012/0214541 A1 * | 8/2012 | Narasimha | H04W 36/0094 |
| | | | 455/67.11 |
| 2020/0305144 A1 | 9/2020 | Babaei et al. | |
| 2020/0374960 A1 | 11/2020 | Deenoo et al. | |

FOREIGN PATENT DOCUMENTS

EP  2448312 A1  5/2012

* cited by examiner

*Primary Examiner* — Barry W Taylor
(74) *Attorney, Agent, or Firm* — Treyz Law Group, P.C.; Michael H. Lyons

(57) ABSTRACT

A wireless network may include a PCELL base station, an SCELL base station, and user equipment (UE) that communicate using standalone carrier aggregation. The UE may receive PCELL signals during first measurement periods, may perform first measurements on the PCELL signals, may receive SCELL signals during second measurement periods, and may perform second measurements on the SCELL signals. When a scheduled reporting time approaches, the UE may compare a duration between a most recent of the second measurement periods and the reporting time to a threshold. If the duration is less than the threshold, the UE may include the most recent second measurement in a measurement report transmitted at the scheduled reporting time. When the duration exceeds the threshold, the receiver may perform a third measurement on the SCELL signals during an unscheduled period prior to the reporting time and may include the third measurement in the measurement report.

20 Claims, 4 Drawing Sheets

SYSTEMS AND METHODS FOR STANDALONE CARRIER AGGREGATION HANDOVER

This application claims the benefit of U.S. Provisional Patent Application No. 63/246,642, filed Sep. 21, 2021, which is hereby incorporated by reference herein in its entirety.

FIELD

This disclosure relates generally to wireless communications, including wireless communications performed by user equipment devices.

BACKGROUND

Communications systems can include electronic devices with wireless communications capabilities. The wireless communications capabilities can include cellular telephone capabilities. An electronic device with cellular telephone capabilities communicates with cellular base stations. Handover is performed to switch the electronic device between different cellular base stations and different frequencies over time.

Care should be taken to ensure that the handover operations are performed in a power and resource efficient manner that minimizes disruptions to the communications performed by the electronic device.

SUMMARY

A wireless network may include at least a first base station, a second base station, and a user equipment (UE) device. The first base station, the second base station, and the UE device may communicate using a standalone (SA) carrier aggregation (CA) scheme. The first base station may be a primary cell (PCELL) base station and the second base station may be a secondary cell (SCELL) base station.

When the SCELL is inactive, the UE device may receive PCELL signals from the PCELL base station during first measurement periods at a first periodicity. A receiver on the UE device may perform first measurements on the PCELL signals during the first measurement periods. The UE device may receive SCELL signals from the SCELL base station during second measurement periods at a second periodicity that is longer than the first periodicity. The receiver may perform second measurements on the SCELL signals during the second measurement periods.

When a scheduled reporting time is approaching, the UE device may identify a duration between a most recent of the second measurement periods and the scheduled reporting time. The UE device may compare the duration to a threshold. If the duration is less than the threshold, the UE device may include the most recent of the second measurements, as performed during the most recent of the second measurement periods, in the measurement report transmitted at the scheduled reporting time. The network and the UE device may then perform a handover away from the PCELL base station and/or a frequency of the PCELL signals based on the measurement report.

On the other hand, when the duration exceeds the threshold duration, the second measurements may be too outdated to be reliably used for handover. For example, if care is not taken, the PCELL base station may be handed over to the SCELL base station during the handover in situations where the SCELL base station would otherwise exhibit poor performance (e.g., due to a fast-fading condition). To mitigate these issues, the receiver may perform a third measurement on the SCELL signals during an unscheduled measurement period between the most recent of the second measurement periods and the scheduled reporting time. The UE device may compare the third measurement to a predetermined criterion. If the predetermined criterion is met, the UE device may include the third measurement instead of the second measurement in the measurement report transmitted at the scheduled reporting time.

An aspect of the disclosure provides a method of operating an electronic device to communicate with a wireless network. The method can include performing first measurements on first signals transmitted by a first base station. The method can include performing second measurements on second signals transmitted by a second base station. The method can include when a duration between a most recent of the second measurements and a reporting time scheduled by the wireless network exceeds a threshold duration, performing a third measurement on the second signals prior to the reporting time. The method can include when the duration is less than the threshold duration, transmitting, at the scheduled reporting time, a measurement report to the network, the measurement report including at least one of the first measurements and at least one of the second measurements.

An aspect of the disclosure provides an electronic device. The electronic device can include one or more antennas configured to receive, during first measurement periods at a first periodicity, first signals from a first wireless base station of a network, receive, during second measurement periods at a second periodicity that is longer than the first periodicity, second signals from a second wireless base station of the network, the first measurement periods and the second measurement periods being scheduled by the network, and receive, during a third measurement period between a most recent of the second measurement periods and a reporting time scheduled by the network, a third signal from the second wireless base station. The electronic device can include a receiver coupled to the one or more antennas and configured to perform a first measurement on the first signals, a second measurement on the second signals, and a third measurements on the third signal. The electronic device can include a transmitter configured to transmit, at the reporting time, a measurement report that includes the first measurement and the third measurement.

An aspect of the disclosure provides a method of performing communications with a wireless network using a standalone (SA) carrier aggregation (CA) scheme. The method can include receiving, during first measurement periods at a first periodicity, primary cell (PCELL) signals transmitted by a PCELL base station. The method can include receiving, during second measurement periods at a second periodicity that is longer than the first periodicity, first secondary cell (SCELL) signals transmitted by an SCELL base station, wherein the first measurement periods and the second measurement periods are scheduled by the network. The method can include receiving, during an unscheduled measurement period between a most recent of the second measurement periods and a reporting time scheduled by the network, second SCELL signals transmitted by the SCELL base station. The method can include performing a first measurement on the PCELL signals, a second measurement on the first SCELL signals, and a third measurement on the second SCELL signals. The method can include transmitting, at the reporting time, a measurement report that includes the first measurement and the third measurement.

DETAILED DESCRIPTION

Figure 1:
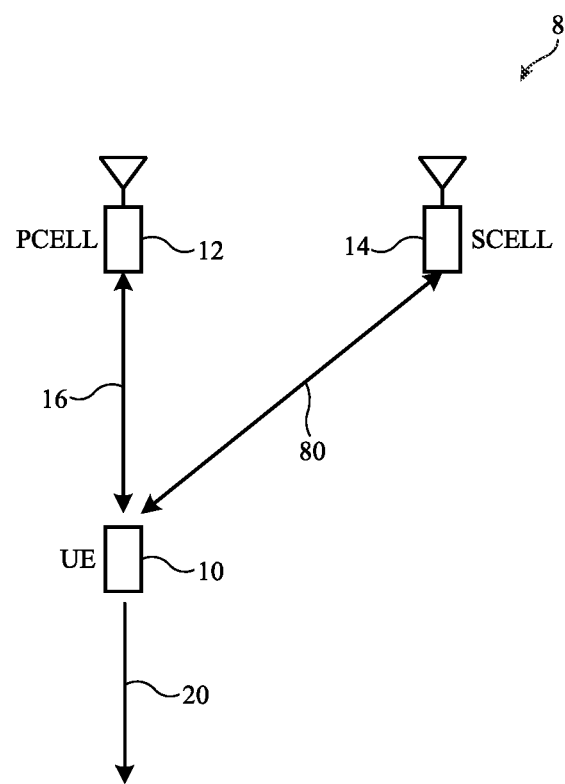
FIG. 1 is a diagram of an illustrative communications network having a user equipment device that concurrently communicates with a primary cell (PCELL) base station and a secondary cell (SCELL) base station using a carrier aggregation (CA) scheme in accordance with some embodiments.

FIG. 1 is a schematic diagram of an illustrative communications system 8 (sometimes referred to herein as communications network 8) for conveying wireless data between communications terminals. Communications system 8 may include network nodes (e.g., communications terminals). The network nodes may include user equipment (UE) such as one or more UE devices 10. The network nodes may also include external communications equipment (e.g., communications equipment other than UE devices 10) such as at least a first wireless base station (gNB) 12 and a second wireless base station (gNB) 14.

It may be desirable to simultaneously receive and/or transmit radio-frequency signals in two different frequency bands to increase data throughput for UE device 10. For example, UE device 10 may communicate using a communications protocol that supports and/or is configured to support carrier aggregation (CA) schemes (e.g., a 3GPP 5G NR FR1 and/or FR2 protocol, a Long Term Evolution (LTE) protocol, etc.). By concurrently conveying wireless data using two different communications bands, UE device 10 may be provided with increased bandwidth relative to scenarios where only a single band is used. If desired, UE device 10 may simultaneously communicate with two or more base stations in two different communications bands (e.g., device 10 may perform carrier aggregation over multiple base stations). For example, device 10 may simultaneously communicate with base station 12 and with base station 14 using a CA scheme.

When performing carrier aggregation with multiple base stations, UE device 10 may first establish a wireless connection with a single base station such as base station 12. The first base station with which UE device 10 establishes a wireless link may sometimes be referred to herein as a Primary Component Carrier (PCC), primary base station, primary cell (PCELL) base station, or simply as a primary cell (PCELL). In the example of FIG. 1, base station 12 may be a PCELL base station and may therefore sometimes be referred to herein as PCELL base station 12. Radio-frequency signals 16 conveyed between PCELL base station 12 and UE device 10 may sometimes be referred to herein as primary component carrier signals, primary signals, primary component signals, primary carrier signals, or PCC signals, primary cell signals, or PCELL signals (e.g., PCELL signals 16) and the wireless links between PCELL base station 12 and UE device 10 may sometimes be referred to herein as primary connections, primary wireless links, or PCELL links.

Once a primary wireless connection has been established between UE device 10 and PCELL base station 12, UE device 10 may establish an additional (supplemental or secondary) wireless connection/link with another base station such as base station 14 (e.g., without dropping the connection with the PCELL base station). UE device 10 may then simultaneously communicate with both base stations (e.g., using different frequency bands in a carrier aggregation scheme). Additional base stations that establish a connection with UE device 10 after UE device 10 has established a wireless connection with a PCELL base station may sometimes be referred to herein as Secondary Component Carriers (SCCs), secondary base stations, or secondary cell (SCELL) base stations. In the example of FIG. 1, base station 14 may be an SCELL base station and may therefore sometimes be referred to herein as SCELL base station 14. Radio-frequency signals 18 conveyed between the SCELL base station 14 and UE device 10 may sometimes be referred to herein as secondary component carrier signals, secondary signals, secondary component signals, secondary carrier signals, SCC signals, or SCELL signals (e.g., SCELL signals 18), and the wireless links between the SCELL base station 14 and UE device 10 may sometimes be referred to herein as secondary connections or secondary wireless links.

Device 10 may establish a connection with a primary base station and one or more secondary base stations at downlink and uplink frequencies (e.g., downlink and uplink frequency bands). In other words, UE device 10 may perform wireless communications with base stations 12 and 14 using a carrier aggregation (CA) scheme in which radio-frequency signals are concurrently conveyed in uplink and/or downlink directions at one or more different frequencies (e.g., using one or more different component carriers) with both base station 12 and base station 14. For example, during wireless communications, device 10 may concurrently transmit uplink (UL) signals in multiple frequency ranges (e.g., using multiple different uplink component carriers) to base station 12 and base station 14. Device 10 may also concurrently receive downlink (DL) signals from base station 12 and base station 14 in multiple frequency ranges (e.g., using multiple different downlink component carriers).

At a given moment in time, base station 12 may be a primary cell (PCELL) base station 12. PCELL Base station 12 may communicate with UE device 10 using radio-frequency signals 16 (primary cell signals 16 or PCELL signals 16). Radio-frequency signals 16 may be at first frequencies (e.g., PCELL frequencies or a PCELL carrier). On the other hand, base station 14 may be a secondary cell (SCELL) base station 14. SCELL Base station 14 may communicate with UE device 10 using radio-frequency signals 18 (secondary cell signals 18 or SCELL signals 18). Radio-frequency signals 18 may be at second frequencies (e.g., SCELL frequencies or an SCELL carrier). The assignment of different base stations as a PCELL base station or an SCELL base station may change over time.

Communications system 8 may form a part of a larger communications network that includes network nodes coupled to base stations 12 and 14 via wired and/or wireless links. The larger communications network may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. The larger communications network may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. UE device 10 may send data to and/or may receive data from other nodes or terminals in the larger communications network via base stations 12 and 14 (e.g., base stations 12 and 14 may serve as an interface between UE device 10 and the rest of the larger communications network). Some or all of the communications network may, if desired, be operated by a corresponding network operator or service provider. Base stations 12 and 14 and nodes of communications system 38 other than UE device 10 may sometimes be referred to herein collectively as "the network."

Wireless base stations 12 and 14 may each include one or more antennas that provide wireless coverage for UE devices located within corresponding geographic areas or regions, sometimes referred to as cells. The size of the cells may correspond to the maximum transmit power level of the wireless base stations and the over-the-air attenuation characteristics for radio-frequency signals conveyed by the wireless base stations, for example.

Figure 2:
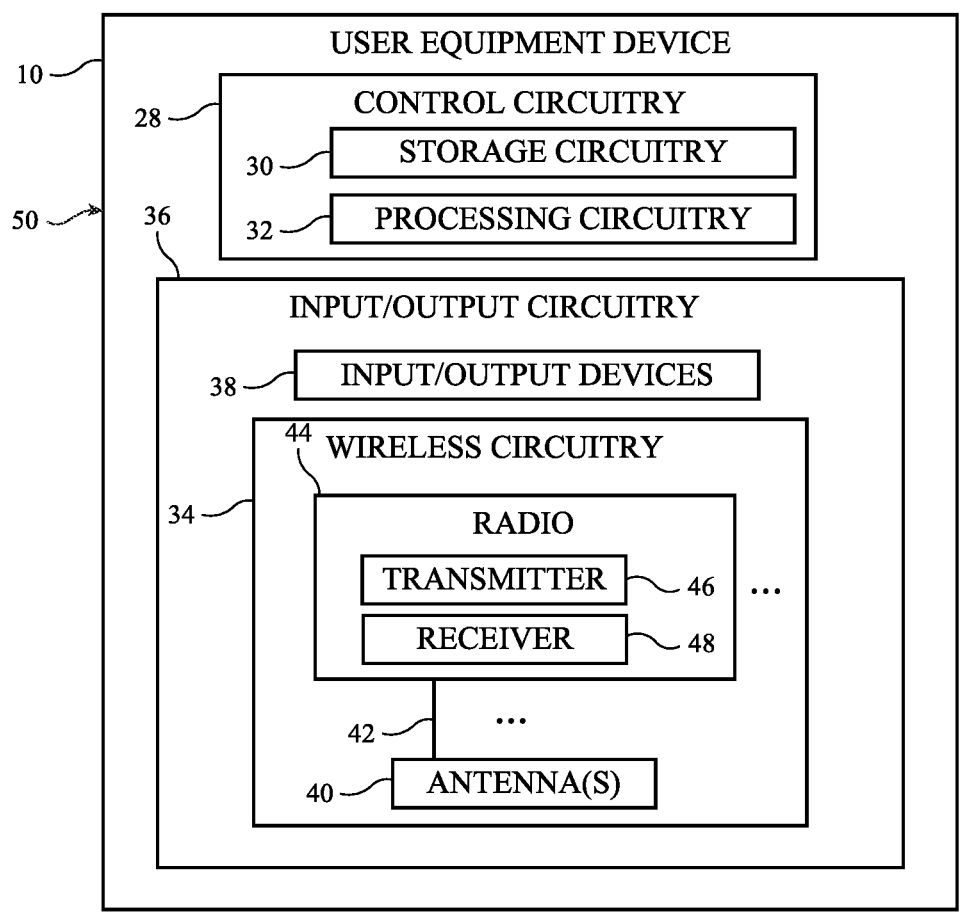
FIG. 2 is a functional block diagram of an illustrative user equipment device in accordance with some embodiments.

FIG. 2 is a block diagram of an illustrative electronic device 10. Device 10 may be a user equipment (UE) device that is owned and/or operated by a user and that wirelessly communicates with external communications equipment. The external communications equipment may include a wireless base station or access point or another UE device, as examples. Device 10 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in FIG. 2, UE device 10 may include components located on or within an electronic device housing such as housing 50. Housing 50, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 50 may be formed from dielectric or other low-conductivity material (e.g., glass, ceramic, plastic, sapphire, etc.). In other situations, housing 50 or at least some of the structures that make up housing 50 may be formed from metal elements.

UE device 10 may include control circuitry 28. Control circuitry 28 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 30 may include storage that is integrated within UE device 10 and/or removable storage media.

Control circuitry 28 may include processing circuitry such as processing circuitry 32. Processing circuitry 32 may be used to control the operation of UE device 10. Processing circuitry 32 may include on one or more processors such as microprocessors, microcontrollers, digital signal processors, host processors, baseband processor integrated circuits, application specific integrated circuits, central processing units (CPUs), graphics processing units (GPUs), etc. Control circuitry 28 may be configured to perform operations in UE device 10 using hardware (e.g., dedicated hardware or circuitry), firmware, and/or software. Software code for performing operations in UE device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 28 may be used to run software on device 10 such as one or more software applications (apps). The applications may include satellite navigation applications, internet browsing applications, voice-over-internet-protocol (VOIP) telephone call applications, email applications, media playback applications, operating system functions, gaming applications, productivity applications, workplace applications, augmented reality (AR) applications, extended reality (XR) applications, virtual reality (VR) applications, scheduling applications, consumer applications, social media applications, educational applications, banking applications, spatial ranging applications, sensing applications, security applications, media applications, streaming applications, automotive applications, video editing applications, image editing applications, rendering applications, simulation applications, camera-based applications, imaging applications, news applications, and/or any other desired software applications.

To support interactions with external communications equipment, control circuitry 28 may be used in implementing communications protocols. Communications protocols that may be implemented using control circuitry 28 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, 6G protocols, cellular sideband protocols, etc.), device-to-device (D2D) protocols, antenna diversity protocols, satellite navigation system protocols (e.g., global positioning system (GPS) protocols, global navigation satellite system (GLONASS) protocols, etc.), antenna-based spatial ranging protocols, or any other desired communications protocols. Each communications protocol may be associated with a corresponding radio access technology (RAT) that specifies the physical connection methodology used in implementing the protocol. Radio-frequency signals conveyed using a cellular telephone protocol may sometimes be referred to herein as cellular telephone signals.

UE device 10 may include input-output circuitry 36. Input-output circuitry 36 may include input-output devices 38. Input-output devices 38 may be used to allow data to be supplied to UE device 10 and to allow data to be provided from UE device 10 to external devices. Input-output devices 38 may include user interface devices, data port devices, and other input-output components. For example, input-output devices 38 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to UE device 10 using wired or wireless connections (e.g., some of input-output devices 38 may be peripherals that are coupled to a main processing unit or other portion of UE device 10 via a wired or wireless link).

Input-output circuitry 36 may include wireless circuitry 34 to support wireless communications. Wireless circuitry 34 (sometimes referred to herein as wireless communications circuitry 34) may include one or more antennas 40. Wireless circuitry 34 may also include one or more radios 44. Radio 44 may include circuitry that operates on signals at baseband frequencies (e.g., baseband circuitry) and radio-frequency transceiver circuitry such as one or more radio-frequency transmitters 46 and one or more radio-frequency receivers 48. Transmitter 46 may include signal generator circuitry, modulation circuitry, mixer circuitry for upconverting signals from baseband frequencies to intermediate frequencies and/or radio frequencies, amplifier circuitry such as one or more power amplifiers, digital-to-analog converter (DAC) circuitry, control paths, power supply paths, switching circuitry, filter circuitry, and/or any other circuitry for transmitting radio-frequency signals using antenna(s) 40. Receiver 48 may include demodulation circuitry, mixer circuitry for downconverting signals from intermediate frequencies and/or radio frequencies to baseband frequencies, amplifier circuitry (e.g., one or more low-noise amplifiers (LNAs)), analog-to-digital converter (ADC) circuitry, control paths, power supply paths, signal paths, switching circuitry, filter circuitry, and/or any other circuitry for receiving radio-frequency signals using antenna(s) 40. The components of radio 44 may be mounted onto a single substrate or integrated into a single integrated circuit, chip, package, or system-on-chip (SOC) or may be distributed between multiple substrates, integrated circuits, chips, packages, or SOCs.

Antenna(s) 40 may be formed using any desired antenna structures for conveying radio-frequency signals. For example, antenna(s) 40 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antenna(s) 40 over time. If desired, two or more of antennas 40 may be integrated into a phased antenna array (sometimes referred to herein as a phased array antenna) in which each of the antennas conveys radio-frequency signals with a respective phase and magnitude that is adjusted over time so the radio-frequency signals constructively and destructively interfere to produce a signal beam in a given pointing direction.

The term "convey radio-frequency signals" as used herein means the transmission and/or reception of the radio-frequency signals (e.g., for performing unidirectional and/or bidirectional wireless communications with external wireless communications equipment). Antenna(s) 40 may transmit the radio-frequency signals by radiating the radio-frequency signals into free space (or to free space through intervening device structures such as a dielectric cover layer). Antenna(s) 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Each radio 44 may be coupled to one or more antennas 40 over one or more radio-frequency transmission lines 42. Radio-frequency transmission lines 42 may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission lines 42 may be integrated into rigid and/or flexible printed circuit boards if desired. One or more radio-frequency lines 42 may be shared between multiple radios 44 if desired. Radio-frequency front end (RFFE) modules may be interposed on one or more radio-frequency transmission lines 42. The radio-frequency front end modules may include substrates, integrated circuits, chips, or packages that are separate from radios 44 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 42.

Radio 44 may transmit and/or receive radio-frequency signals within corresponding frequency bands at radio frequencies (sometimes referred to herein as communications bands or simply as "bands"). The frequency bands handled by radio 44 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired.

Transmitter 46 may transmit radio-frequency signals over antenna(s) 40 when transmitter 46 is active (e.g., enabled). Transmitter 46 does not transmit radio-frequency signals over antenna(s) 40 when transmitter 46 is inactive (e.g., disabled or not actively transmitting sign). Similarly, receiver 48 may receive radio-frequency signals over antenna(s) 40 when receiver 48 is active (e.g., enabled). Receiver 48 does not receive radio-frequency signals over antenna(s) 40 when receiver 48 is inactive (e.g., disabled). Control circuitry 28 may control transmitter 46 to be active or inactive at any given time. Control circuitry 28 may also control receiver 48 to be active or inactive at any given time. Control circuitry 28 may activate or deactivate transmitter 46 and/or receiver 48 at different times as dictated by a communications protocol governing radio 44 and/or based on instructions provided by a user and/or from other software running on control circuitry 28, for example.

Control circuitry 28 may configure transmitter 46 to be inactive by powering off transmitter 46, by providing control signals to switching circuitry on power supply or enable lines for transmitter 46, by providing control signals to control circuitry on transmitter 46, and/or by providing control signals to switching circuitry within transmitter 46, for example. When transmitter 46 is inactive, some or all of transmitter 46 may be inactive (e.g., disabled or powered off) or transmitter 46 may remain powered on but without transmitting radio-frequency signals over antenna(s) 40. Similarly, control circuitry 28 may configure receiver 48 to be inactive by powering off receiver 48, by providing control signals to switching circuitry on power supply or enable lines for receiver 48, by providing control signals to control circuitry on receiver 48, and/or by providing control signals to switching circuitry within receiver 48, for example. When receiver 48 is inactive, some or all of receiver 48 may be disabled (e.g., powered off) or receiver 48 may remain powered on but without actively receiving radio-frequency signals incident upon antenna(s) 40. Transmitter 46 and receiver 48 may consume more power on UE device 10 when active than when inactive (e.g., a battery on UE device 10 may drain more rapidly while transmitter 46 and receiver 48 are active than while transmitter 46 or receiver 48 are inactive). Transitioning transmitter 46 or receiver 48 from an inactive state to an active state may sometimes be referred to herein as waking the transmitter or receiver.

The example of FIG. 2 is illustrative and non-limiting. While control circuitry 28 is shown separately from wireless circuitry 34 in the example of FIG. 1 for the sake of clarity, wireless circuitry 34 may include processing circuitry (e.g., one or more processors) that forms a part of processing circuitry 32 and/or storage circuitry that forms a part of storage circuitry 30 of control circuitry 28 (e.g., portions of control circuitry 28 may be implemented on wireless circuitry 34). As an example, control circuitry 28 may include baseband circuitry (e.g., one or more baseband processors), digital control circuitry, analog control circuitry, and/or other control circuitry that forms part of radio 44. The baseband circuitry may, for example, access a communication protocol stack on control circuitry 28 (e.g., storage circuitry 30) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer. If desired, the PHY layer operations may additionally or alternatively be performed by radio-frequency (RF) interface circuitry in wireless circuitry 34.

The communications protocol governing radio-frequency signals 16 and 18 of FIG. 1 may support carrier aggregation (CA) operations. The CA operations may include standalone (SA) CA operations and non-standalone (non-SA) CA operations. SA CA operations involve using only a 5G NR communications protocol to support radio-frequency signals 16 and 18 (e.g., both the PCELL signals and the SCELL signals are conveyed over 5G NR frequency bands). Non-SA CA operations involve using the LTE communications protocol as an anchor for radio-frequency signals 16 and 18 while also using the 5G NR communications protocol to boost the anchor. UE device 10 may convey data or voice traffic with PCELL base station 12 and SCELL base station 14 over SA CA, for example.

Under SA CA (e.g., when the network is configured to use SA CA), if traffic is relatively low, the network may deactivate SCELL base station 14 for communicating with UE device 10 (e.g., when the additional throughput supported by SA CA is not needed). In general, the network may have already configured PCELL base station 12 and SCELL base station 14 for UE device 10 but does not use/activate SCELL base station 14 until the UE has been informed with an activation message (e.g., when the SCELL is needed to support higher data rates). The network may deactivate SCELL base station 14, but UE device 10 may still be aware of the network configuration of SCELL base station 14 (e.g., without using the resources of the SCELL).

When performing SA CA operations, UE device 10 may periodically wake up to listen to pilot signals (e.g., reference signals) transmitted by the PCELL base station 12 and/or SCELL base station 14 (e.g., during corresponding measurement periods). UE device 10 may receive radio-frequency signals and may monitor for data traffic in the radio-frequency signals and/or may gather wireless performance metric data associated with received signals during the measurement periods. UE device 10 may use first measurement periods (sometimes referred to herein as PCELL measurement periods) to measure radio-frequency signals 16 from PCELL base station 12 and may use second measurement periods (sometimes referred to herein as SCELL measurement periods) to measure radio-frequency signals 18 from SCELL base station 14.

When traffic levels are relatively low, SCELL base station 14 may be inactive for UE device 10 (e.g., as configured by the network). When SCELL base station 14 is inactive (e.g., the SCELL is inactive), the measurement periods for the PCELL base station 12 occur at a first rate (periodicity) whereas the measurement periods for SCELL base station 14 occur at a second rate (periodicity) that is significantly lower than the first rate (e.g., as determined by the 5G NR communications protocol). For example, the first periodicity for the measurement periods for the PCELL may be 320 ms whereas the second periodicity for the measurement periods for the SCELL may be 3200 ms.

The UE device may measure receiver performance for the PCELL and/or SCELL during the measurement periods and may transmit corresponding measurement reports (MR) to PCELL base station 12 and/or SCELL base station 14 that are indicative of the receiver performance of the UE device in the PCELL and/or SCELL. The network may then update frequency and/or CA settings for UE device 10 based on the measurement reports.

In some scenarios, the UE device (e.g., receiver 48) may measure a sudden drop in receiver performance for the PCELL (e.g., as measured for downlink radio-frequency signals 16 transmitted by PCELL base station 12), sometimes referred to as a fast-fading condition. If UE device 10 measures such a fast-fading condition for the PCELL, UE device 10 and the network may attempt to handover the PCELL for UE device 10 to a different frequency band and/or to a different base station (e.g., where the different frequency or base station will serve as the new/updated PCELL for UE device 10). This may, for example, allow UE device 10 to continue to perform satisfactory radio-frequency communications despite the fast-fading condition.

However, since the measurement periods for the PCELL occur much more frequently than the measurement periods for the SCELL (e.g., while the SCELL is inactive), the previous (most-recent) measurement of receiver performance in the SCELL may be outdated at the time the drop in receiver performance of the PCELL is measured. If the sudden drop in receiver performance (the fast-fading condition) affected both the PCELL and the SCELL (which may be likely, depending on the cause of the drop in receiver performance, such as when an obstacle has blocked UE device 10 from a line-of-sight with both PCELL base station 12 and SCELL base station 14 or when UE device 10 suddenly moves away from both base stations such as in the direction of arrow 20 of FIG. 1), UE device 10 and the network may mistakenly believe that the SCELL performance was unaffected, due to the delayed (slow) measurement of the SCELL. There is therefore a risk that the network and UE device 10 will perform a handover to assign the previous SCELL (e.g., SCELL base station 14) to subsequently operate as the new (updated) PCELL base station for subsequent communications. This may deteriorate the wireless performance of UE device 10 and/or cause UE device 10 to needlessly cycle (ping-pong) between using the previous PCELL (e.g., PCELL base station 12) and the previous SCELL (e.g., SCELL base station 14) as the new/updated PCELL, limiting the overall performance of the network.

Figure 3:
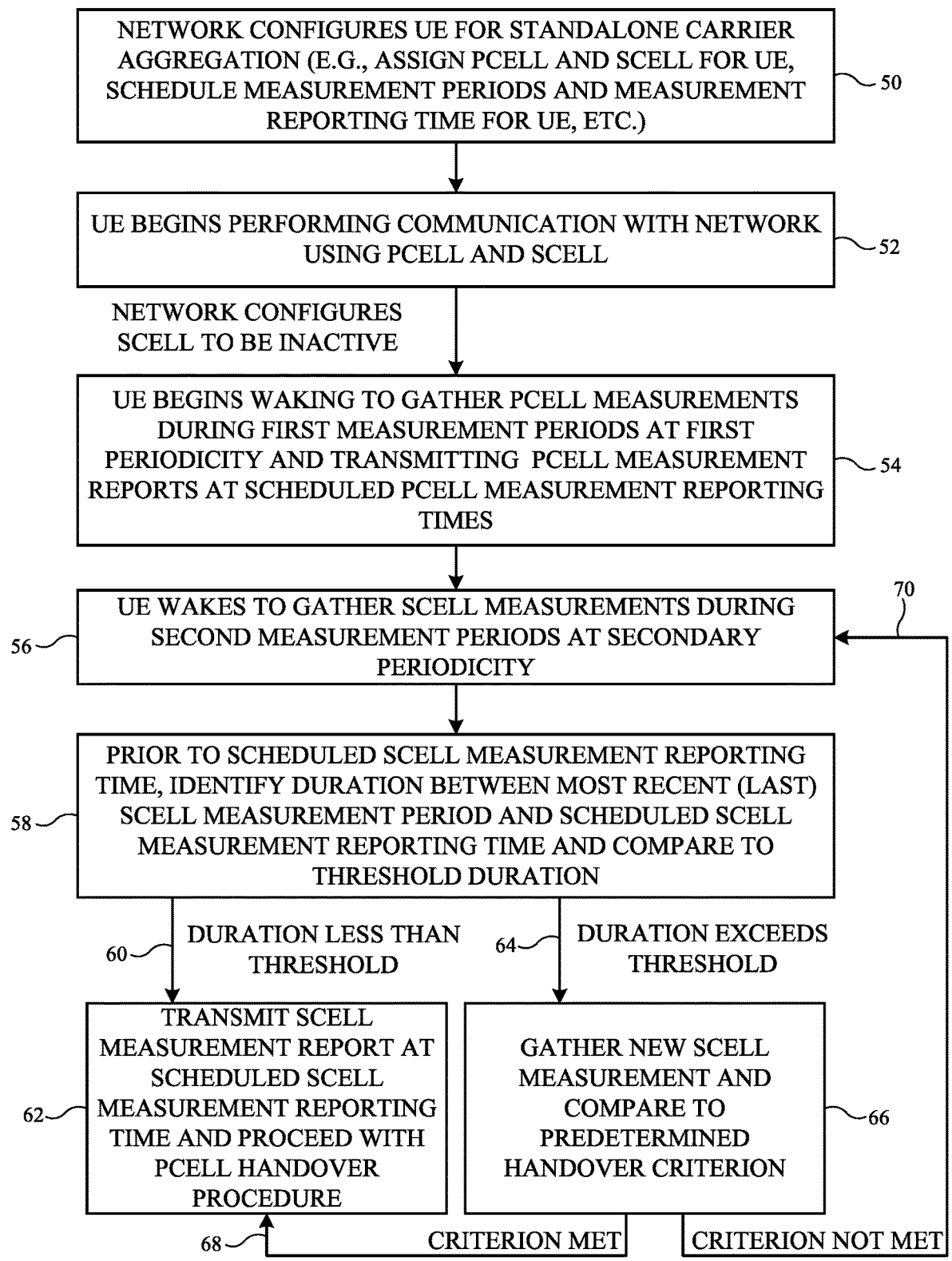
FIG. 3 is a flow chart of illustrative operations that may be performed by a user equipment device to minimize disruptions to communication during a handover procedure in accordance with some embodiments.

FIG. 3 is a flow chart of illustrative operations that may be performed by UE device 10 to mitigate these issues and to allow for handover with minimal disruption to communications (e.g., under SA CA when the SCELL is inactive).

At operation 50, the network (e.g., one or more processors on base station 12, base station 14, or another node in communications system 8) may configure UE device 10 to use SA CA. The network may, for example, configure and schedule base station 12 to serve as the PCELL base station for UE device 10 and may configure and schedule base station 14 to serve as the SCELL base station for UE device 10. This may involve assigning a PCELL frequency for PCELL signals 16 and an SCELL frequency for SCELL signals 18. This may also involve scheduling first (PCELL) measurement periods and reporting times for UE device 10 and second (SCELL) measurement periods and reporting times for UE device 10.

At operation 52, UE device 10 may begin performing communication (e.g., conveying wireless data) with the network using PCELL base station 12 and SCELL base station 14 (e.g., via PCELL signals 16 and SCELL signals 18). During communication, UE device 10 may gather PCELL measurements during the scheduled PCELL measurement periods, may gather SCELL measurements during the scheduled SCELL measurement periods, and may transmit the PCELL and SCELL measurement periods in a measurement report during the scheduled reporting times. The network may use the SCELL measurements and the PCELL measurements to determine when and how to perform handover for UE device 10 (e.g., to hand UE device 10 over to a new PCELL base station and/or frequency).

At some point during the communication, the network may decide to deactivate SCELL base station 14. For example, when traffic levels are relatively low, the network may configure SCELL base station 14 to be inactive for UE device 10. If desired, UE device 10 may transmit a message (e.g., a UE assistance information message, which is a type of radio resource control (RRC) message) to the network that instructs the network to configure SCELL base station 14 to be active or that otherwise indicates to the network that UE device 10 can support communications while SCELL base station 14 is inactive (e.g., the UE may indicate to the network that the UE does not need all of the resources supported by SA CA and therefore can support a reduced component carrier, bandwidth, and/or MIMO configuration). UE device 10 may, for example, desire fewer communications resources when the UE is overheating, low on remaining data service, or otherwise does not need high bandwidth.

When SCELL base station 14 is inactive, SCELL base station 14 is no longer used to convey wireless data for UE device 10 (whereas PCELL base station 12 continues to convey wireless data for UE device 10). However, SCELL base station 14 may still transmit periodic pilot signals (e.g., DL reference signals) while SCELL base station 14 is inactive. When SCELL base station 14 is inactive, this could potentially implicate a ping-pong scenario during a subsequent PCELL handover, and processing may proceed to operation 54 (e.g., to eliminate the possibility of such a scenario).

When the SCELL is inactive, the network configures (schedules) the PCELL measurement periods to have a first periodicity (e.g., the same periodicity as when the SCELL was active). At the same time, the network may configure (e.g., modify or re-schedule) the SCELL measurement periods to have a second periodicity that is less than the first periodicity (e.g., as much as 5-20× longer or less than the first periodicity). For example, the first periodicity may be scheduled to be 320 ms whereas the second periodicity is scheduled to be 3200 ms. The PCELL base station may transmit periodic pilot signals (e.g., DL reference signals) during at least the first measurement periods. The SCELL base station may transmit periodic pilot signals during at least the second measurement periods.

At operation 54, the receiver on UE device 10 may wake to gather signal measurements from transmitted PCELL signals such as the PCELL pilot signals (sometimes referred to herein as PCELL measurements) during the first measurement periods (with the first periodicity). Gathering signal measurements may, for example, include gathering wireless performance metric data. UE device 10 may gather wireless performance metric data from the PCELL signals (e.g., at the frequency of the PCELL signals), from frequencies around, adjacent to, or neighboring the frequency of the PCELL signals, and/or from frequencies used by other base stations in the vicinity of UE device 10 (e.g., pilot signals transmitted by the PCELL base station or other base stations that could potentially serve as a new PCELL frequency or PCELL base station after handover). The wireless performance metric data may characterize the performance of the receiver on UE device 10 in receiving signals. The wireless performance metric data may include, for example, received signal power level values, reference signal received power (RSRP) values, reference signal received quality (RSRQ) values, signal-to-noise ratio (SNR) values, error rate values, or other values characterizing the reception of the wireless signals. UE device 10 may transmit a measurement report identifying the PCELL measurements for use by the network in determining if, when, and/or how to perform handover.

At operation 56, which may be performed concurrently with operation 54, the receiver on UE device 10 may wake to gather signal measurements from transmitted SCELL signals such as the SCELL pilot signals (sometimes referred to herein as SCELL measurements) during the second measurement periods (with the second periodicity). Gathering signal measurements may, for example, include gathering wireless performance metric data. UE device 10 may gather wireless performance metric data from the SCELL signals (e.g., at the frequency of the SCELL signals), from frequencies around, adjacent to, or neighboring the frequency of the SPCELL signals, and/or from frequencies used by other base stations in the vicinity of UE device 10 (e.g., pilot signals transmitted by the SCELL base station or other base stations that could potentially serve as a new PCELL frequency or PCELL base station after handover). The wireless performance metric data may characterize the performance of the receiver on UE device 10 in receiving signals. The wireless performance metric data may include, for example, received signal power level values, reference signal received power (RSRP) values, reference signal received quality (RSRQ) values, signal-to-noise ratio (SNR) values, error rate values, or other values characterizing the reception of the wireless signals.

At operation 58, prior to the next scheduled reporting time for SCELL measurements, UE device 10 may identify a time duration between the most recent (e.g., last or latest) SCELL measurements and the next scheduled reporting time for the SCELL measurements. UE device 10 may compare the duration to a threshold duration (e.g., a threshold between 320 ms and 3200 ms). If the duration is less than the threshold duration, this may be indicative of the SCELL measurements being sufficiently up-to-date (fresh), such that there is minimal risk of a ping-pong scenario during subsequent handover of the PCELL. Processing may then proceed to operation 62 over path 60.

At operation 62, UE device 10 may transmit the SCELL measurements in a measurement report at the scheduled reporting time for the SCELL measurements (which may be the same as a reporting time for the PCELL measurements or which may be different from the reporting time for the PCELL measurements). UE device 10 may transmit the measurement report to the network (e.g., PCELL base station 12 and/or SCELL base station 14). The network (e.g., one or more processors on PCELL base station 12, SCELL base station 14, or another network node of communication system 38) may then proceed with a handover procedure based on the measurement report. For example, if the PCELL measurements and/or the SCELL measurements identified in the measurement report indicate that a different frequency and/or base station exhibits superior performance (e.g., superior wireless performance metric data) than the current PCELL base station and/or frequency, the network may perform a handover from the current PCELL frequency and/or base station to a new PCELL frequency and/or base station.

If the duration identified at operation 58 exceeds the threshold duration, this may be indicative of the SCELL measurements being insufficiently up-to-date (e.g., stale or outdated). If care is not taken, this may produce an elevated risk of a ping-pong scenario during subsequent handover of the PCELL. Processing may then proceed to from operation 58 to operation 64 via path 64.

At operation 66, control circuitry 28 on UE device 10 may wake the receiver on UE device 10 to gather additional (new or fresh) SCELL measurements during a new measurement period prior to the next scheduled reporting time for the SCELL measurements. In other words, the UE device may proactively perform new SCELL measurements during a new measurement period that was not otherwise scheduled by the network. UE device 10 may then compare the new SCELL measurements to a predetermined criterion to determine whether handover should be performed for UE device 10.

As one example, the predetermined criterion may be met when there is a neighboring cell, frequency, or base station, that produced wireless performance metric data (SCELL measurements) indicative of superior receiver performance than the current PCELL frequency and/or base station, when there is a neighboring cell, frequency, or base station, that produced wireless performance metric data (SCELL measurements) indicative of superior receiver performance than the current PCELL frequency and/or base station by a predetermined threshold (e.g., 5 dB), and/or when there is a neighboring cell, frequency, or base station, that produced wireless performance metric data (SCELL measurements) that exceeded a predetermined threshold value or that is within a predetermined range of performance metric values.

If the predetermined criterion is unmet, processing may loop back to operation 56 via path 70 (e.g., UE device 10 may forego transmitting the new SCELL measurements to the network) as the UE device continues to gather SCELL measurements during the scheduled SCELL measurement periods (e.g., while performing new/fresh unscheduled SCELL measurements as necessary when each reporting period for SCELL measurements approaches). If the predetermined criterion is met, processing may proceed from operation 66 to operation 62 via path 68 and UE device 10 may transmit the SCELL measurements in a measurement report at the scheduled reporting time for the SCELL measurements. The network (e.g., one or more processors on PCELL base station 12, SCELL base station 14, or another network node of communication system 38) may then proceed with a handover procedure based on the measurement report.

In this way, the network may ensure that SCELL measurements by UE device 10 are not too old or outdated despite the periodicity of SCELL measurements being less than the periodicity of PCELL measurements when the SCELL is configured to be inactive while the network operates in an SA CA mode. This may prevent or minimize scenarios where the network assigns an otherwise poorly-performing SCELL base station (e.g., due to the outdated SCELL measurement) to serve as PCELL upon measurement of a fast-fading condition on the PCELL. This may serve to prevent needless alternation (ping-pongs) between PCELL and SCELL base stations in the fast-fading condition and may serve to optimize wireless communications between UE device 10 and the network when operating in SA CA mode. UE device 10 may continue gathering PCELL measurements during the scheduled PCELL measurement periods while processing operations 56-66 and may transmit the PCELL measurements in the measurement report transmitted at operation 62 (e.g., at the scheduled reporting time) for use by the network in performing handover.

Figure 4:
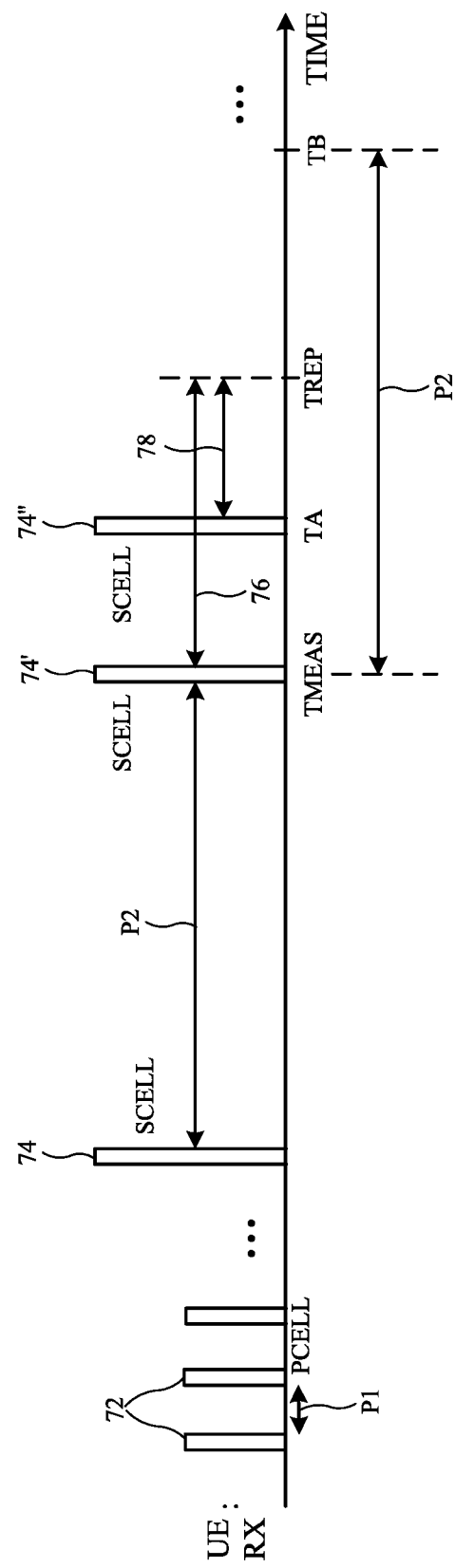
FIG. 4 is a timing diagram showing how a user equipment device may perform a fresh SCELL measurement prior to transmitting an SCELL measurement report for use in a handover procedure in accordance with some embodiments.

FIG. 4 is a timing diagram showing how UE device 10 may perform a fresh SCELL measurement prior to transmitting a measurement report to the network for use in a handover. As shown in FIG. 4, the network may schedule UE device 10 to gather PCELL measurements during PCELL measurement periods 72 having first periodicity P1. When the SCELL is inactive, the network may schedule UE device 10 to gather SCELL measurements during SCELL measurement periods 74 having second periodicity P2, which is much lower (longer) than first periodicity P1. The network may also schedule UE device 10 transmit a measurement report containing SCELL measurements and PCELL measurements at reporting time TREP.

When UE device 10 performs SCELL measurements that are within one SCELL measurement period (e.g., within periodicity P2) from the next scheduled reporting time TREP, UE device 10 may identify the duration between those SCELL measurements and the scheduled reporting time TREP. For example, the network-scheduled SCELL measurement period 74' at time TMEAS is within second periodicity P2 from the scheduled reporting time TREP (e.g., scheduled reporting time TREP is sooner than the next scheduled SCELL measurement period at time TB). As such, UE device 10 may identify the duration 76 between the network-scheduled SCELL measurement period 74' (e.g., time TMEAS) and scheduled reporting time TREP (e.g., while processing operation 58 of FIG. 3).

UE device 10 may compare duration 76 to a threshold value. If duration 76 is less than the threshold value, UE device 10 does not need to perform new SCELL measurements before scheduled reporting time TREP and may simply transmit the SCELL measurements gathered during SCELL measurement period 74' in a measurement report at scheduled reporting time TREP (e.g., processing may proceed from operation 58 to operation 62 via path 60). However, if duration 76 is greater than the threshold value, UE device 10 may perform new (updated or fresh) SCELL measurements during an unscheduled SCELL measurement period 74" at time TA, which is after the last scheduled SCELL measurement period at time TMEAS and prior to the scheduled reporting time TREP. Unscheduled SCELL measurement period 74" may be separated from scheduled reporting time TREP by duration 78, which is less than the threshold value. In this way, UE device 10 is certain to provide up-to-date SCELL measurements to the network for use in handover, thereby mitigating the risk of a ping-pong scenario when handing over the PCELL.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-3 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 30 of FIG. 2). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A method of operating an electronic device to communicate with a wireless network, the method comprising:
    performing first measurements on first signals transmitted by a first base station;
    performing second measurements on second signals transmitted by a second base station;
    when a duration between a most recent of the second measurements and a reporting time scheduled by the wireless network exceeds a threshold duration, performing a third measurement on the second signals prior to the reporting time; and
    when the duration is less than the threshold duration, transmitting, at the scheduled reporting time, a measurement report to the network, the measurement report including at least one of the first measurements and at least one of the second measurements.

2. The method of claim 1, wherein performing the first measurements comprises performing the first measurements during first measurement periods scheduled by the wireless network, the first measurement periods having a first periodicity.

3. The method of claim 2, wherein performing the second measurements comprises performing the second measurements during second measurement periods scheduled by the wireless network, the second measurement periods having a second periodicity that is longer than the first periodicity.

4. The method of claim 3, wherein the most recent of the second measurements is performed during a most recent of the second measurement periods, the reporting time scheduled by the network being a first reporting time after the most recent of the second measurement periods.

5. The method of claim 4, wherein the second periodicity is at least five times longer than the first periodicity.

6. The method of claim 1, wherein the first base station comprises a primary cell (PCELL) base station and the second base station comprises a secondary cell (SCELL) base station.

7. The method of claim 6, further comprising:
performing, with the wireless network and based on the transmitted measurement report, a handover away from the PCELL base station.

8. The method of claim 1, further comprising:
when the third measurement meets a predetermined criterion, transmitting the third measurement to the wireless network at the scheduled reporting time.

9. The method of claim 8 wherein the first base station comprises a primary cell (PCELL) base station, the second base station comprises a secondary cell (SCELL) base station, and the method further comprises:
performing, with the wireless network and based on the transmitted third measurement, a handover away from the PCELL base station.

10. The method of claim 8, further comprising:
when the third measurement does not meet the predetermined criterion, foregoing transmission of the third measurement to the wireless network.

11. The method of claim 10, further comprising:
determining whether the third measurement meets the predetermined criterion by comparing the third measurement to the at least one of the first measurements.

12. An electronic device comprising:
one or more antennas configured to
receive, during first measurement periods at a first periodicity, first signals from a first wireless base station of a network,
receive, during second measurement periods at a second periodicity that is longer than the first periodicity, second signals from a second wireless base station of the network, the first measurement periods and the second measurement periods being scheduled by the network, and
receive, during a third measurement period between a most recent of the second measurement periods and a reporting time scheduled by the network, a third signal from the second wireless base station;
a receiver coupled to the one or more antennas and configured to perform a first measurement on the first signals, a second measurement on the second signals, and a third measurements on the third signal; and
a transmitter configured to transmit, at the reporting time, a measurement report that includes the first measurement and the third measurement.

13. The electronic device of claim 12, wherein the reporting time is a first reporting time scheduled by the network following the most recent of the second measurement periods.

14. The electronic device of claim 12, wherein the transmitter is configured to transmit the first measurement and the third measurement in the measurement report when a duration between the most recent of the second measurement periods and the reporting time exceeds a threshold value.

15. The electronic device of claim 14, wherein the transmitter is configured to transmit the first measurement and the second measurement in the measurement report when the duration is less than the threshold value.

16. The electronic device of claim 12, wherein the first signals comprise primary cell (PCELL) signals and the second signals and the third signal comprise secondary cell (SCELL) signals.

17. The electronic device of claim 12, wherein the first measurement, the second measurement, and the third measurement comprise a received signal power level value, a reference signal received power (RSRP) value, a reference signal received quality (RSRQ) value, a signal-to-noise ratio (SNR) value, or an error rate value.

18. A method of operating an electronic device to perform communications with a wireless network using a standalone (SA) carrier aggregation (CA) scheme, the method comprising:
receiving, during first measurement periods at a first periodicity, primary cell (PCELL) signals transmitted by a PCELL base station;
receiving, during second measurement periods at a second periodicity that is longer than the first periodicity, first secondary cell (SCELL) signals transmitted by an SCELL base station, wherein the first measurement periods and the second measurement periods are scheduled by the network;
receiving, during an unscheduled measurement period between a most recent of the second measurement periods and a reporting time scheduled by the network, second SCELL signals transmitted by the SCELL base station;
performing a first measurement on the PCELL signals, a second measurement on the first SCELL signals, and a third measurement on the second SCELL signals; and
transmitting, at the reporting time, a measurement report that includes the first measurement and the third measurement.

19. The method of claim 18, further comprising:
prior to receiving the PCELL signals and the first SCELL signals, transmitting a message to the wireless network that identifies that the electronic device does not require communication resources of the SCELL base station.

20. The method of claim 18, wherein the reporting time is a first reporting time scheduled by the network following the most recent of the second measurement periods, transmitting the measurement report comprises transmitting the first measurement and the third measurement in the measurement report when a duration between the most recent of the second measurement periods and the reporting time exceeds a threshold value, and the method further comprises:
when the duration is less than the threshold value, transmitting the first measurement and the second measurement in the measurement report.

* * * * *